United States Patent [19]

Krijgsman

[11] Patent Number: 4,983,374
[45] Date of Patent: Jan. 8, 1991

[54] METHODS FOR FORMING TITANIUM CALCIUM OXIDE AND ZIRCONIUM CALCIUM OXIDE

[76] Inventor: Dieter Krijgsman, 10, Groteweg, 8191JW - Wapenveld, Netherlands

[21] Appl. No.: 394,286

[22] Filed: Aug. 15, 1989

Related U.S. Application Data

[60] Continuation of Ser. No. 164,745, Mar. 7, 1988, abandoned, which is a division of Ser. No. 887,753, Jul. 18, 1986, Pat. No. 4,753,787.

[51] Int. Cl.⁵ .................... C01G 23/04; C01G 25/02
[52] U.S. Cl. .................................. 423/593; 423/598
[58] Field of Search ............... 423/593, 598; 501/135, 501/136, 123

[56] References Cited

U.S. PATENT DOCUMENTS

| | | | |
|---|---|---|---|
| 2,880,076 | 3/1959 | Kircher, Jr. et al. | 422/132 |
| 3,331,658 | 7/1967 | Lewis et al. | 423/598 |
| 3,755,553 | 8/1973 | Kutolin et al. | 423/593 |
| 4,238,240 | 12/1980 | Krijgsman | 106/120 |
| 4,366,121 | 12/1982 | Krijgsman | 422/110 |
| 4,545,970 | 10/1985 | Krijgsman | 106/120 |
| 4,636,378 | 1/1987 | Pastor et al. | 423/598 |
| 4,643,984 | 2/1987 | Abe et al. | 423/593 |
| 4,753,787 | 6/1988 | Krijgsman | 423/659 |

FOREIGN PATENT DOCUMENTS 8501933 5/1985 PCT Int'l Appl. ............... 423/598

*Primary Examiner*—Melvyn J. Andrews
*Attorney, Agent, or Firm*—Skjerven, Morrill, MacPherson, Franklin & Friel

[57] ABSTRACT

A method of forming titanium calcium oxide is disclosed comprising the steps of mixing titanium hydroxide, calcium hydroxide, and water in an autoclave, then heating these reaction constituents at a selected temperature and pressure for a time to allow the formation of titanium calcium oxide crystals of a desired size. Next, pressure in a receiving vessel is set below the pressure in the autoclave, and a valve is opened to allow the reaction product to flow from the autoclave to the receiving vessel at a constant flow rate. Heat is removed from the reaction product while the reaction product passes through a flow passage between the autoclave and the receiving vessel. This process can be modified to form zirconium calcium oxide.

10 Claims, 1 Drawing Sheet

METHODS FOR FORMING TITANIUM CALCIUM OXIDE AND ZIRCONIUM CALCIUM OXIDE

This application is a continuation application Ser No. 07/164,745, filed Mar. 7, 1988 now abandoned, which is a division of application Ser. No. 06/887,753, filed July 18, 1986 now U.S. Pat. No. 4753,787.

FIELD OF THE INVENTION

This invention relates to a method of forming a reaction product such as calcium silicate, titanium calcium oxide, magnesium calcium oxide, and zirconium calcium oxide and similar reaction products and the structure employed to form these reaction products.

DESCRIPTION OF THE PRIOR ART

In my earlier U.S. Pat. Nos. 4,238,240, 4,366,121 and 4,545,970 I describe numerous prior art structures and processes for forming reaction products. These prior patents are hereby incorporated by reference.

In my '240 U.S. Patent I disclose a method for forming a reaction product in which the reaction constituents are mixed in an autoclave, the mixed reaction constituents are then reacted for a selected time to form reaction products and the reaction products are transferred, at the end of the reaction, from the autoclave to another vessel (sometimes called a "receiving vessel" and sometimes called an "antipressure vessel") connected to the autoclave by a flow passage. The pressure in the vessel is held in a controlled manner beneath the pressure in the autoclave during the transfer of the reaction products from the autoclave to the vessel. To maintain the pressure in the vessel in a controlled manner beneath the pressure in the autoclave during the transfer of the reaction products from the autoclave to the vessel, I disclose an electronic control system which measures the pressures in the autoclave and the vessel and which opens or closes a valve (shown as valve 101 in FIG. 1 of the '240 patent) attached to the receiving vessel (vessel 12 in the '240 patent) to maintain the pressure in the vessel beneath the pressure in the autoclave (shown as autoclave 10 in the '240 patent). I also disclose an alternative embodiment in the '240 patent wherein the electronic control system is replaced by a throttle valve or by a valve and a vent pipe. Before the start of the transfer operation, a suitable pressure difference is established between the autoclave and the receiving vessel. Then to start the transfer of the reaction product from the autoclave to the antipressure vessel, a valve between the autoclave and the vessel is opened and simultaneously or subsequently, as desired, a pressure release valve on the top of the receiving vessel is opened and left open during the transfer process. As a result, the reaction product from the autoclave flows into the vessel at an instantaneous rate determined by the instantaneous pressure difference between the autoclave and the receiving vessel. As I disclose in the '240 patent, this pressure difference is controlled by the sizes of the valve and vent pipe or the setting of the throttle valve. This embodiment avoids the use of a control circuit but has the potential disadvantage that the transfer is not as precisely controlled as with a control circuit.

SUMMARY

In accordance with this invention I provide a substantially simplified system for transferring the contents of the autoclave 10 to the antipressure vessel 12. The system of this invention incorporates a pressure release valve on antipressure vessel 12, the setting of which is precisely controlled by a control signal from a flow meter used to measure the volumetric flow of the reaction product. In the preferred embodiment the pressure release valve is controlled to maintain a constant flow of reaction product from autoclave 10 to antipressure vessel 12.

My invention provides a novel method of initializing the pressure in the antipressure vessel 12 by releasing gas (typically steam) from the autoclave 10 through a vent pipe into the antipressure vessel 12 prior to the transfer of reaction product from the autoclave to the antipressure vessel 12. When the pressure in vessel 12 is equal to the pressure in autoclave 10, the vent pipe is closed and the pressure in vessel 12 falls slightly beneath the pressure in autoclave 10 as a result of the natural cooling of the gas in vessel 12 due to heat transfer to the relatively cooler walls of vessel 12. As vessel 12 comes to a relatively steady state temperature after several batches of reaction product have been passed to vessel 12, the pressure difference between autoclave 10 and vessel 12 due to this natural cooling effect becomes less and when the gas is steam, relatively little steam condenses to create this pressure difference. This method and structure avoids the use of costly compressors as in the prior art to initialize the pressure in antipressure vessel 12. When the gas is steam, the method requires a surprisingly small amount of steam from the autoclave 10 to pressurize the antipressure vessel 12 due to the fact that the steam in the autoclave 10 is at a high pressure and temperature and therefore contains a high volume of $H_2O$ per cubic meter.

This invention will be more fully understood in conjunction with the following detailed description taken together with the attached drawing.

DETAILED DESCRIPTION

The following detailed description is intended to be illustrative only of one embodiment of the invention and not to limit the invention. The specification of my U.S. Pat. No. 4,238,240 illustrates in detail one reaction process for the formation of calcium silicate and will be referred to from time-to-time in the following description.

Figure 1:
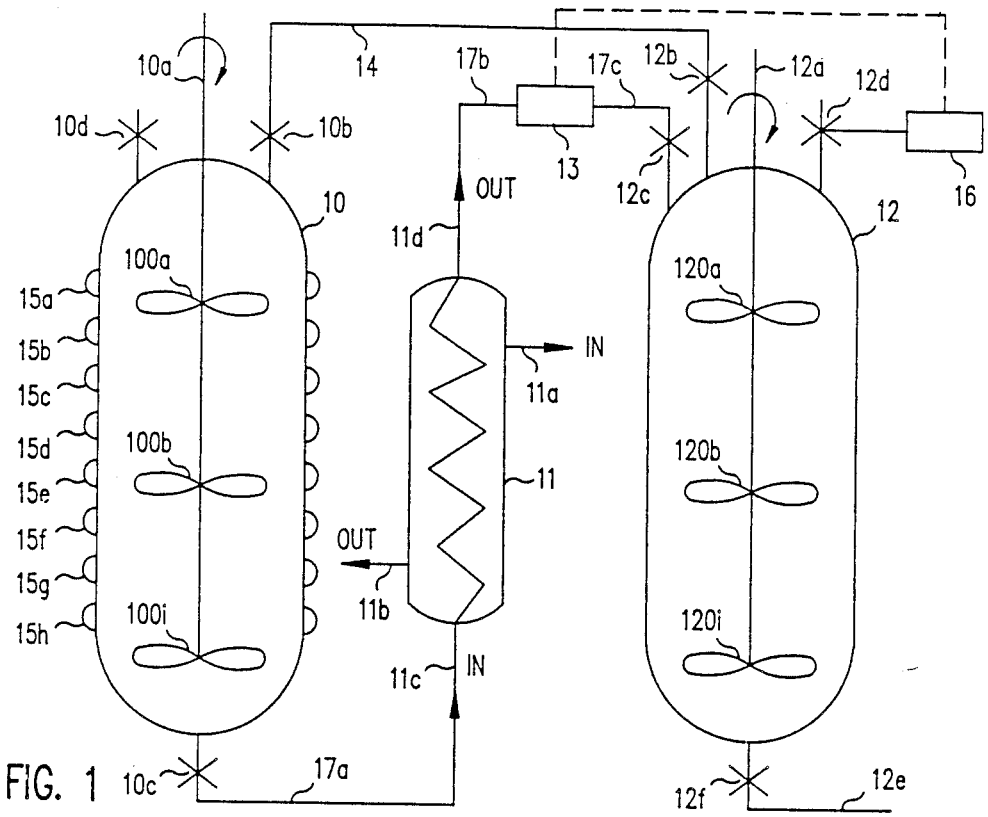
FIG. 1 illustrates an autoclave and an antipressure vessel interconnected in accordance with the principles of this invention.

As will be apparent from a comparison of FIG. 1 with FIG. 1 of the '240 patent, the system of this invention for the formation of a reaction product is substantially changed from that disclosed in the '240 patent. Thus autoclave 10 possesses an outlet controlled by valve 10c and an inlet controlled by valve 10d both of a type well known in the art. An agitator 10a has a plurality of paddles 100a, 100b to 100i where i is an integer equal to the maximum number of paddles used with the agitator. The blades on the paddles are preferably of the INTER-MIG ® type supplied by EKATO in West Germany. In the preferred embodiment of this invention six paddles are used on agitator 10a. However, a different number of paddles can be used if desired based upon experimental results. Agitator 10a is, in accordance with this invention, a variable speed agitator with a speed which, in one embodiment, varies from 60 rpm to 150 rpm. Of course, these speeds can also be changed if desired to achieve appropriate results depending upon the reaction products desired.

Autoclave 10 is heated by the use of a thermal oil of well known constituents. The thermal oil first is heated in a thermal oil boiler (not shown but well known in the arts) and then is pumped through hollow semicircular coils wound in a plurality of banks on the outer surface of autoclave 10. FIG. 1 shows eight cross-sections 15a through 15h of one bank of such semicircular coils. Typically four banks of coils are used and one bank contains eight (8) spirals of heating coils which pass the thermal oil in one direction. The adjacent bank also contains eight (8) spirals of heating coils but passes thermal oil in the other direction. The use of the plurality of banks of coils minimizes the temperature drop of the heating oil in any one bank to ensure that the surface of the autoclave is reasonably uniformly heated in the steady state. In one embodiment, the temperature drop of the heating oil from the inlet to the outlet of the bank is kept to less than twenty degrees centigrade. This small temperature drop coupled with the use of the agitators allows the temperature of the reaction product in the autoclave to be kept substantially uniform within about $\pm 1°$ C.

Agitator 10a within autoclave 10 is controlled to mix the reaction products within autoclave 10 to ensure substantially uniform temperature throughout the reaction products. Properly controlling the speed of agitator 10, gives substantially uniform temperature throughout the autoclave. As a result, the crystal growth of the reaction product within autoclave 10 is also controlled to be substantially uniform.

The reaction product is formed by controlling the temperature of the reaction constituents within autoclave 10 to within a selected value for a selected period of time at a desired pressure. In one embodiment, the pressure in autoclave 10 is increased substantially over that disclosed in my prior U.S. Pat. No. 4,238,240. In particular, in my preferred embodiment for forming calcium silicate reaction products in accordance with this invention, the temperature within the autoclave 10 is held at 318° centigrade, corresponding roughly to 110 BAR pressure absolute which is the saturation pressure of the water with the reaction constituents. The use of this high temperature and pressure has several beneficial effects. First, when one is fabricating a reaction product such as calcium silicate, a reaction constituent such as silica is more soluble in water at 318° centigrade than at a lower temperature. This means that a lower quality silica can be used in the reaction without detrimentally affecting the quality of the reaction product and that the reaction will take place at a higher rate within the autoclave. As disclosed in a report published by Lawrence Berkeley Laboratory, University of Calif. (LBL-14722) entitled "A Database for Nuclear Waste Disposal for Temperatures up to 300° C." by Sidney L. Phillips and Leonard F. Silvester, Sep. 1982, the amount of silica in solution can be calculated according to equation 15 set forth in that paper. This equation states that log S (where S is the solubility of silica in water in gram moles per liter) is a function of temperature as follows:

$$\text{Log } S = -0.320 - 697.12/T(K) \quad (1)$$

Using this equation one can calculate the solubility per liter of amorphous silica $SiO_2$ dissolved in water at the preferred temperature. As the temperature goes up, the amount of material dissolved also goes up. Similar equations are available for other inorganic materials giving the solubility of these materials in water as a function of temperature. Accordingly, there is a substantial advantage to operating the autoclave 10 at a higher temperature and pressure than previously considered advisable.

The system in FIG. 1 also includes an outlet valve 10q connected to an outlet line 17 (composed of sections 17a, 17b and 17c). Outlet line 17 passes the reaction products from autoclave 10 through heat exchanger 11. Heat exchanger 11 contains an inlet 11a and an outlet 11b for the passage of a fluid into the heat exchanger 11 to receive the heat from the reaction product flowing through line 17. As described in the '240 patent, the removal of heat from the reaction products makes available the transferred heat for further use thereby increasing the efficiency of the process and further stabilizes the reaction products in a desired form before the reaction products reach the antipressure vessel 12.

The reaction products flowing through pipe 17 pass into heat exchanger 11 at inlet 11c and out from heat exchanger 11 through outlet 11d. From outlet 11d the reaction products flow through pipe 17b, flow meter 13 (preferably a magnetic flow meter), pipe 17c and inlet valve 12c into receiving vessel 12. Vessel 12 likewise contains an agitator 12a containing a plurality of paddles 120a, 120b... through 120i, where i is likewise an integer representing the number of paddles on agitator 12a. The blades of paddles 120 are also preferably the INTERMIG ® type from EKATO in West Germany. One embodiment of this invention uses six (6) such paddles although again the number of paddles used can be determined empirically depending upon the quality desired for the resulting product. Vessel 12 has an outlet 12e with a valve 12f for controlling the removal of material from vessel 12. In addition, a vent 12d is provided. Vent 12d includes a pressure release valve (preferably a digital valve) which is electronically coupled to flow meter 13 in such a way as to maintain substantially constant the volumetric flow of material from autoclave 10 into holding vessel 12. This ensures that the steam from autoclave 10 which was previously placed in receiving vessel 12 prior to the start of the transfer of the reaction products from autoclave 10 to vessel 12 is released from vessel 12 at the same volumetric rate as the reaction products from autoclave 10 enter vessel 12.

Prior to the transfer of reaction products from autoclave 10 to vessel 12, steam from autoclave 10 is bled from autoclave 10 into vessel 12 by opening valves 10b and 12b on line 14 connecting autoclave 10 to vessel 12. Steam is allowed to flow from autoclave 10 to vessel 12 until the pressure in vessel 12 equals the pressure in autoclave 10. As soon as the pressures are equal in vessel 12 and autoclave 10, valves 10b and 12b are closed and valves 10c and 12c are opened. Because vessel 12 has not been heated by thermal fluid as has vessel 10, the natural transfer of heat from the steam within vessel 12 to the walls of vessel 12 cools down the steam and lowers the pressure within vessel 12, thereby starting the transfer of the reaction products from autoclave 10 to vessel 12.

As soon as the flow of the reaction products from autoclave 10 to vessel 12 starts, valve 12d (preferably a digital valve) is opened to a selected value to maintain the flow as detected by magnetic flow meter 13 at a selected value. Alternatively, valve 12d can be opened to lower the pressure in vessel 12 and start the transfer of the reaction product from autoclave 10 to vessel 12. Flow meter 13 measures volumetric flow rate. Of course, a mass flow meter can be used if desired. Flow meter 13 produces an electrical output signal representative of the volumetric flow rate of the reaction product from autoclave 10 to vessel 12. This electrical output signal is transmitted to control 16 of a well-known design which in turn produces a digital output signal which controls the setting of digital valve 12d. Should the flow rate of reaction products through flow meter 13 be beneath the desired value, valve 12d is opened to decrease the pressure in receiving vessel 12 by allowing steam within that vessel to vent to the atmosphere. Should the flow rate of reaction products through magnetic flow meter 13 be higher than desired, control 16 closes down valve 12d to reduce the amount of steam allowed to escape from vessel 12 thereby to properly control the flow rate of reaction products through magnetic flow meter 13 to the desired value. Flow meter 13 typically has an accuracy of about plus or minus 1% over its whole range and thus the flow of reaction products through pipe 15 can be controlled within this accuracy using a negative feedback control system. In this system the output signal from the flow meter 13 is compared to a reference signal representative of the desired volumetric flow rate of the reaction products from autoclave 10 to vessel 12 and the difference between these two signals, expressed as a digital signal, is used to control the setting of valve 12d. While the volumetric flow rate is controlled in the preferred embodiment, mass flow rate could, if desired, be controlled. As part of the control system, the instantaneous pressures in autoclave 10 and vessel 12 are measured using sputtered film pressure transducers of a type made available by CEC Corporation in Pasadena, Calif. These transducers are linear and reproducible over a range of pressures typically up to several hundred atmospheres and retain their accuracy over their lifetime.

Figure 2:
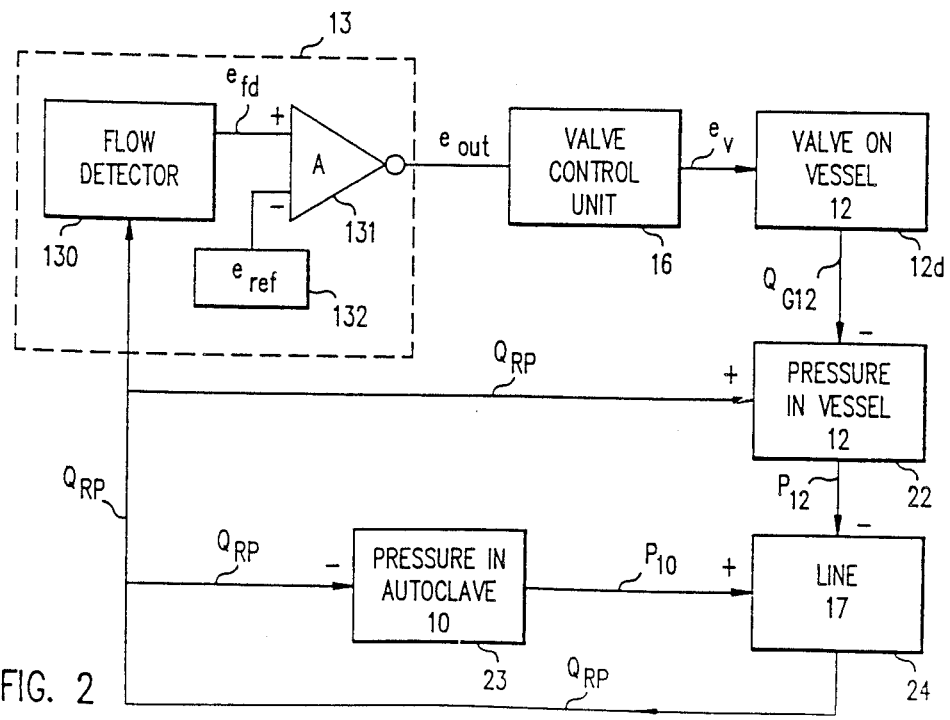
FIG. 2 illustrates schematically the control system of this invention.

FIG. 2 illustrates schematically the control system of this invention. The magnetic flow meter 13 comprises several components. A flow detector 130 actually detects the volumetric flow $Q_{RP}$ of reaction products from autoclave 10 to vessel 12 and produces an electrical output signal $e_{fd}$ which is transmitted to the noninverting input lead of a differential amplifier 131. A reference voltage $e_{ref}$ from a reference voltage source 132 is applied to the inverting input of amplifier 132. The output voltage $e_{out}$ from differential amplifier 131 represents the difference in the output signal $e_{fd}$ from the flow detector 130 and the output signal $e_{ref}$ from the reference source 131. This output voltage $e_{out}$ is transmitted to valve control unit 16 which generates a digital output signal $e_v$ (which comprises six bits transmitted to digital valve 12d preferably in parallel on a six channel bus) which controls digital valve 12d mounted on vessel 12 (see FIG. 1). Digital valve 12d is selected because it is highly linear and does not exhibit significant hysteresis. Moreover, digital valve 12d can be adjusted very rapidly to any one of 64 possible different settings within milliseconds. Typically, digital valve 12d has 6 ports each sized differently to handle a different flow. The combination of all 6 ports open gives the maximum flow through the valve whereas leaving open only the smallest port gives the smallest flow. Each port is controlled by its own magnetic coil and thus the valve can be driven to any one of $2^6$ or 64 linearly related positions extremely rapidly.

The output from valve 12d is the flow rate of gas $Q_{G12}$ from vessel 12. This flow rate reduces the pressure in vessel 12 as shown in FIG. 2 by the negative sign on the input of the arrow from valve 12d to the block 22 labeled "pressure in vessel 12." The pressure in vessel 12 is also increased by the flow of reaction products from autoclave 10 into vessel 12 as illustrated by the plus sign on the arrow associated with the line relating to the flow rate $Q_{RP}$ of the reaction products from the autoclave 10. The pressure in vessel 12 generally restrains the flow of reaction products from autoclave 10 to vessel 12 and thus the output from the block 22 labeled "pressure in vessel 12" is shown as P12 and given a negative sign as an input to line 17. This indicates that this pressure acts as a back pressure on the flow of reaction products through line 17. On the other hand, the pressure P10 in vessel 10 drives the reaction products from autoclave 10 to vessel 12 and thus is shown as a positive influence on line 17. The output from box 24 labeled line 17 is the flow rate of reaction products $Q_{RP}$ from autoclave 10 to vessel 12. The flow of reaction products from autoclave 10 decreases the pressure in autoclave 10 and this is shown by the negative arrow labeled $Q_{RP}$ pointing to block 23. The flow detector 130 detects the flow rate $Q_{RP}$ of the reaction products from the autoclave 10 to vessel 12 and produces the output signal $e_{out}$ representing this flow.

In operation, should the flow drop beneath the desired flow rate indicated by $e_{ref}$, $e_{fd}$ drops beneath $e_{ref}$ and the output signal $e_{out}$ becomes positive thereby driving valve control unit 16 to open valve 12d. Opening valve 12d increases $Q_{G12}$ thereby dropping further the pressure P12 in vessel 12. This increases $Q_{RP}$ Increasing $Q_{RP}$ drops further the pressure P10 in autoclave 10 and increases the pressure P12 in vessel 12. However the flow $Q_{G12}$ is properly selected to increase $Q_{RP}$ to the desired value. On the other hand, should $e_{fd}$ be larger than $e_{ref}$, $e_{out}$ is negative and thus reduces the voltage $e_v$ used to control the setting of valve 12d thereby decreasing $Q_{G12}$ and increasing slightly the pressure P12 in vessel 12 over its nominal value for that time. This slows down the flow of reaction products from autoclave 10 to vessel 12 thus decreasing $Q_{RP}$ In the preferred embodiment, the reaction products are transferred through pipe 17 under laminar flow conditions thereby preventing the crystal structure formed in autoclave 10 from degrading. For safety's sake, the same pressure transducers placed on the top of autoclave 10 and vessel 12 are also connected to safety control circuits to prevent the inadvertent opening by individuals operating the system of any valves during the reaction process. In addition, safety valves are placed on the top of autoclave 10 and the receiving vessel 12 to relieve pressures within these vessels should these pressures exceed safety limits.

The process and structure described above is multipurpose in the sense that the process and structure can be used to provide a number of different reaction products. The pressure and temperature of the process described above have increased substantially compared to the process described in my '240 patent. The process is especially suited for the production of new, higher resistance insulation materials such as composites formed of magnesium, zirconium, and titanium among other materials. In addition, the process can be used to produce ceramic powders such as silicon carbide, silicon nitride, and titanium diboride by means of hydrothermal reactions. This is made possible by the high temperature and pressure used in the reaction process of this invention.

Typical reactions which can be carried out by the structure and process of this invention are those to form titanium calcium oxide, magnesium calcium oxide or zirconium calcium oxide, as follows:

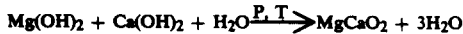

The above reactions are carried out at 318° C, and 110 BAR pressure absolute, which correspond to saturated steam temperature and pressure. The reaction time is selected as a function of the crystal size required. The above hydrothermal reactions are endothermal.

The use of a hydrothermal reaction of this invention to form ceramic powders saves a substantial amount of energy over standard methods for the formation of such ceramic powders. Moreover, the hydrothermal reaction provides ceramic material of substantially uniform crystal size in a powder like form. A typical prior art process for forming such powders involved melting ingredients at a very high temperature (2800° C.–3000° C.), allowing the melted ingredients to cool in a large block to ambient temperatures, crushing the block into smaller parts, coarsely grinding the smaller parts to yield rough crystals and then finely grinding the rough crystals to yield fine powders. By using my invention, this energy intensive process is totally avoided. My hydrothermal process will produce directly fine crystal powder. The hydrothermal reaction takes place at a temperature in the 300° C. range rather than at several thousand degrees centigrade. By controlling the time of reaction the size of the ceramic crystals can be fairly accurately controlled to the desired dimension. Thus the process described above yields a substantial improvement in the formation of uniform crystals of reaction products over the prior art both in terms of energy consumed and the uniformity of the resulting structure.

In addition, the prior art grinding procedure yields crystals of nonuniform and differing sizes even though the resulting materials are substantially fine. This creates certain problems in using these crystals to form finished products. In particular, ceramic materials are known to be brittle despite their other desirable characteristics. Because of this shortcoming, ceramic materials find fewer applications in advanced technology than justified by their potential benefits. Thus research is being done to increase the lifetime and prolong the fatigue limits of ceramic materials such that ceramic materials can be used in new applications to replace a variety of metal composites. However, nonuniformity of ceramic crystal size yields a nonuniform bonding force which in itself relates to discrepancies in the atomic structure of the ceramic crystal making up the ceramic materials. Scanning electron microscope (SEM) exposures of ceramic materials show that fatigue starts at those places where there are substantial differences in uniformity of the ceramic crystals. Apparently the bonding energy between nonuniform crystals is unable to find a so-called harmonic neighbor thus leading to spontaneous fatigue because of the differences in the bonding energy between different size crystals within the material. At this stage of the technological development of materials from ceramic crystals, several companies have acquired improved crystal size uniformity obtained using a grinding process but still the uniformity is not sufficient to allow the proven material to be used in high technology applications such as blades for jet engines. Thus considering these factors, the process of my invention makes possible the fabrication of uniform powders.

My process has the following characteristics:
1. Controlled temperature of the reaction process within plus or minus about one (1) degree Kelvin:
2. Control of pressure by use of pressure transducers such as sputtered film transducers of a type made available by CEC Corporation in Pasadena, Cali.
3. Variable speed stirring equipment using INTERMIG ® blades of a type provided by EKATO in West Germany:
4. Reproducability of reaction products as a function of reaction time and temperature;
5. Use of less energy than prior art processes:
6. Plurality of different reaction products capable of being made with the same system: and
7. The attaining of higher precalculable solubility for reaction constituents to allow accurate characterization of the process.

In view of the above, other embodiments of this invention will be obvious to those skilled in the art.

What is claimed is:

1. A method of forming titanium calcium oxide comprising the steps of:
    mixing reaction constituents comprising titanium hydroxide an calcium hydroxide with water in an autoclave in a stoichiometric ratio;
    reacting said reaction constituents in said autoclave for a time and at a pressure to form in said autoclave non-gaseous reaction products and gas under pressure;
    equalizing the pressure in a receiving vessel with the pressure in said autoclave by transferring a part of said gas from said autoclave to said receiving vessel until the pressure in said receiving vessel equals the pressure in said autoclave at which time the gas transfer is stopped;
    dropping the pressure in said receiving vessel beneath the pressure in said autoclave after the transfer of gas from said autoclave to said receiving vessel is stopped; and
    transferring, once the pressure in said receiving vessel has dropped beneath the pressure in said autocalve, the reaction products from said autoclave to said receiving vessel while maintaining the pressure in said receiving vessel beneath the pressure in said autoclave.

2. The method of claim 1 wherein the pressure in said receiving vessel is dropped beneath the pressure in said autocalve, after the transfer of gas from said autoclave to said receiving vessel is stopped, by allowing heat from the gas to transfer to walls of said receive vessel.

3. The method of claim 2 wherein the step of maintaining the pressure in said receiving vessel beneath the pressure in said autoclave comprises controlling a pressure difference between said autoclave and said receiving vessel to insure a substantially constant flow rate of reaction products from said autocalve to said receiving vessel.

4. The method of claim 1 further including the step of transferring a portion of heat in the reaction products by means of a heat exchanger, thereby to make available the transferred heat for further use.

5. The method of claim 1 wherein the step of maintaining the pressure in said receiving vessel beneath the pressure in said autoclave comprises:
   measuring the flow rate of reaction products from said autoclave to said receiving vessel; and
   adjusting a pressure release valve on said receiving vessel to allow more gas to escape from said receiving vessel to increase the flow rate from said autoclave to said receiving vessel and to allow less gas to escape from said receiving vessel to decrease the flow rate from said autoclave to said receiving vessel.

6. A method of forming zirconium calcium oxide comprising the steps of:
   mixing reaction constituents comprising zirconium hydroxide and calcium hydroxide with water in an autoclave in a stoichiometric ratio;
   reacting said reaction constituents in said autoclave for a time and at a pressure to form in said autoclave non-gaseous reaction products and gas under pressure;
   equalizing the pressure in a receiving vessel with the pressure in said autoclave by transferring a part of said gas from said autoclave to said receiving vessel until the pressure in said receiving vessel equals the pressure in said autoclave at which time the gas transfer is stopped;
   dropping the pressure in said receiving vessel beneath the pressure in said autoclave after the transfer of gas from said autoclave to said receiving vessel is stopped; and
   transferring, once the pressure in said receiving vessel has dropped beneath the pressure in said autoclave, the reaction products from said autoclave to said receiving vessel while maintaining the pressure in said receiving vessel beneath the pressure in said autoclave.

7. The method of claim 6 wherein the pressure in said receiving vessel is dropped beneath the pressure in said autocalve, after the transfer of gas from said autoclave to said receiving vessel is stopped, by allowing heat from the gas to transfer to walls of said receiving vessel.

8. The method of claim 7 wherein the step of maintaining the pressure insaid receiving vessel beneath the pressure in said autoclave comprises controlling a pressure difference between said autoclave and said receiving vessel to insure a substantially constant flow rate of reaction products form said autoclave to said receiving vessel.

9. The method of claim 6 further including the step of transferring a portion of heat in the reaction products by means of a heat exchanger, thereby to make available the transferred heat for further use.

10. The method of claim 6 wherein the step of maintaining the pressure in said receiving vessel beneath the pressure in said autoclave comprises:
   measuring the flow rate of reaction products from said autoclave to said receiving vessel; and
   adjusting a pressure release valve on said receiving vessel to allow more gas to escape fromsaid receiving vessel to increase the flow rate from said autoclave to said receiving vessel and to allow less gas to escape from said receiving vessel to decrease the flow rate form said autoclave to said receiving vessel.

* * * * *